(12) United States Patent
Otten

(10) Patent No.: US 10,910,863 B2
(45) Date of Patent: Feb. 2, 2021

(54) METHODS, CIRCUITS AND SYSTEMS FOR OPERATING SENSOR PACKAGES USING WIRELESS POWER TRANSFER DERIVED FROM ROTATING MEMBERS

(71) Applicant: Sensus Spectrum, LLC, Morrisville, NC (US)

(72) Inventor: Johannes Wilhelmus Antonius Maria Otten, Wake Forest, NC (US)

(73) Assignee: Sensus Spectrum, LLC, Morrisville, NC (US)

(*) Notice: Subject to any disclaimer, the term of this patent is extended or adjusted under 35 U.S.C. 154(b) by 51 days.

(21) Appl. No.: 15/800,658

(22) Filed: Nov. 1, 2017

(65) Prior Publication Data
US 2019/0131813 A1 May 2, 2019

(51) Int. Cl.
*H02J 7/00* (2006.01)
*H02J 7/02* (2016.01)
*H02J 50/80* (2016.01)
*H02J 50/10* (2016.01)
*H02J 5/00* (2016.01)
*H02J 7/04* (2006.01)
*G01V 3/10* (2006.01)
*H02K 11/225* (2016.01)
*H02K 11/215* (2016.01)
*H02J 50/90* (2016.01)

(52) U.S. Cl.
CPC ............... *H02J 7/025* (2013.01); *G01V 3/10* (2013.01); *H02J 5/005* (2013.01); *H02J 7/042* (2013.01); *H02J 50/10* (2016.02); *H02J 50/80* (2016.02); *H02K 11/215* (2016.01); *H02K 11/225* (2016.01); *H02J 50/90* (2016.02)

(58) Field of Classification Search
USPC ........................................................ 320/108
See application file for complete search history.

(56) References Cited

U.S. PATENT DOCUMENTS

| 8,378,511 B2* | 2/2013 | Sichau ................ F03B 13/1855 290/42 |
| 8,810,196 B2* | 8/2014 | Ettes ........................ H02J 7/025 320/108 |
| 2004/0078662 A1* | 4/2004 | Hamel ................ B60C 23/0411 714/22 |
| 2008/0252446 A1 | 10/2008 | Dammertz |

(Continued)

FOREIGN PATENT DOCUMENTS

WO    WO 2012/099965 A2    7/2012

OTHER PUBLICATIONS

Notification of Transmittal of the International Search Report and the Written Opinion of the International Searching Authority, or the Declaration, PCT/US2018/058426, dated Jan. 21, 2019, 15 pages.

(Continued)

*Primary Examiner* — Samuel Berhanu
(74) *Attorney, Agent, or Firm* — Stanek Lemon Crouse & Meeks, P.A.

(57) ABSTRACT

A method of charging an energy storage device can be provided by wirelessly coupling to a rotating member contained in a housing using a coil attached to an exterior of the housing and charging an energy storage device using a current induced in the coil.

20 Claims, 6 Drawing Sheets

(56) References Cited

U.S. PATENT DOCUMENTS

| | | | | |
|---|---|---|---|---|
| 2015/0008876 A1* | 1/2015 | Kwak | ................... | H02J 50/10 |
| | | | | 320/108 |
| 2015/0226805 A1* | 8/2015 | Albers | ................... | H04Q 9/00 |
| | | | | 702/182 |
| 2016/0228723 A1* | 8/2016 | Mohamed | ............... | A61N 2/02 |
| 2017/0033588 A1* | 2/2017 | Wu | ........................ | H02J 7/025 |
| 2017/0194837 A1* | 7/2017 | Sichau | ................... | H02S 30/20 |
| 2018/0076671 A1* | 3/2018 | Chopra | ................. | H01F 38/14 |

OTHER PUBLICATIONS

ABB Ability™ Smart Sensor—Motors that let you know when it's time for a service, http.//new.abb.com/motors-generators/service/advanced-services/smart-sensor, 2017, 5 pages.
Augury, Platform Overview, https://www.augury.com/solution/platform-overview, 2015, 11 pages.
GRUNDFOS, Remote Management, Pump monitoring and electronic motor protection, 2011, 2 pages.
ITT, i-ALERT® 2, Equipment Health Monitor, 2007, 8 pages.
MOVUS FitMachine®, MOVUS Australia Pty Ltd, Dec. 30, 2016, 2 pages.
PLEQ Predictive Maintenance Suite, http://www.pleq.io/, Aug. 6, 2017, 9 pages.
PumpMeter by KSB—reliable pump monitoring helps increase efficiency, https://www.ksb.com/ksb-en/About-KSB/Research/Automation/PumpMeter, 2007, 2 pages.

\* cited by examiner

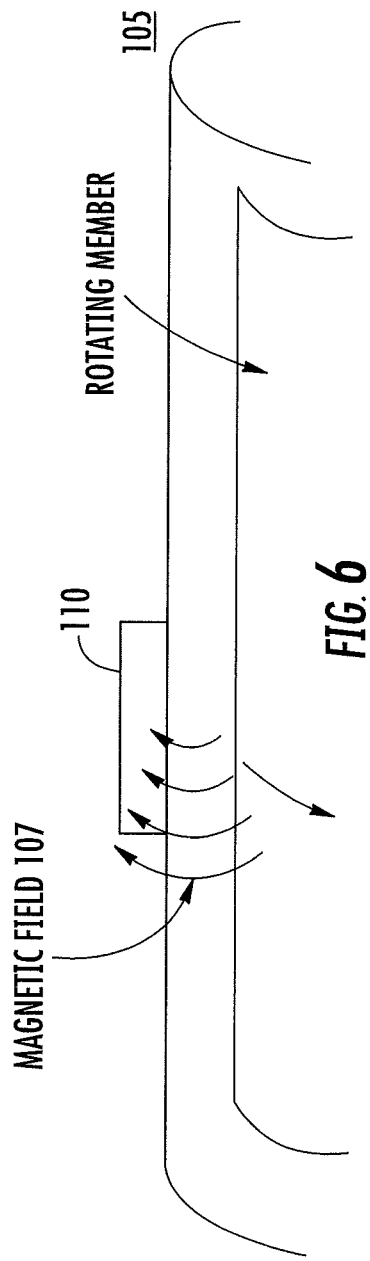
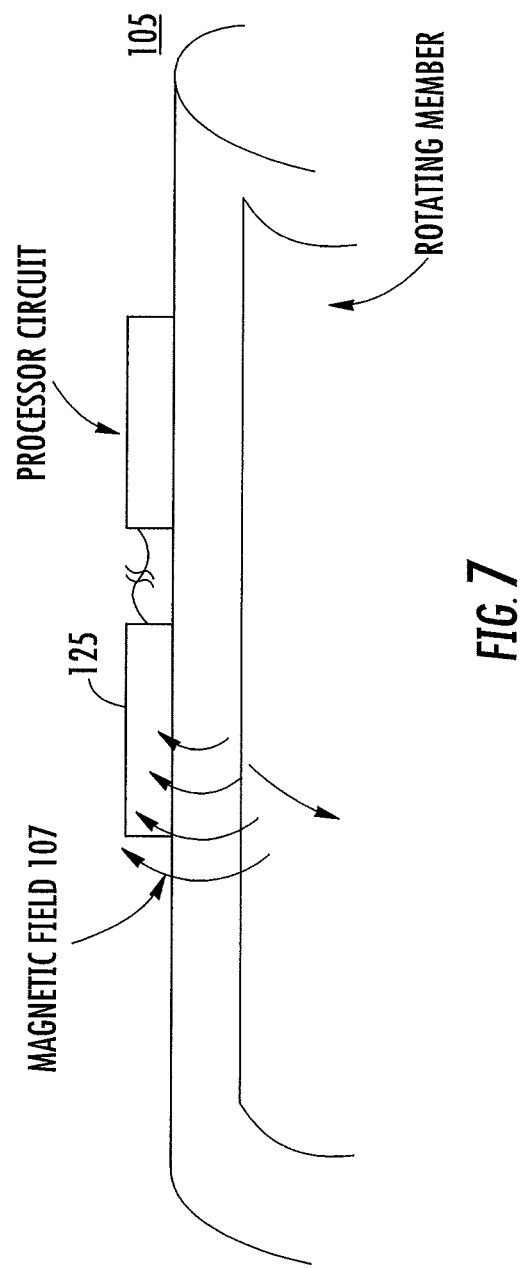

METHODS, CIRCUITS AND SYSTEMS FOR OPERATING SENSOR PACKAGES USING WIRELESS POWER TRANSFER DERIVED FROM ROTATING MEMBERS

FIELD

The present inventive concept relates to the field of power in general and, more specifically, to wireless power transfer.

BACKGROUND

It is known to the use sensors with devices such as motors to collect operational data. The collected operational data may then be transmitted to a remote server for storage and/or analysis. For example, it is known to attach a vibration sensor to a motor and collect vibration data as the motor operates. The vibration data can be stored by a processor circuit that is proximate to the motor and then transmitted to a remote server for storage and/or analysis. The vibration data can be used to determine the condition of the motor which may be used to predict when the motor may require service or fail.

SUMMARY

Embodiments according to the invention can provide methods, circuits and systems for operating sensor packages using wireless power transfer derived from rotating members. Pursuant to these embodiments, a method of charging an energy storage device can be provided by wirelessly coupling to a rotating member contained in a housing using a coil attached to an exterior of the housing and charging an energy storage device using a current induced in the coil.

In some embodiments, an apparatus can include a coil configured to wirelessly couple to a rotating member, the rotating member contained in a housing and the coil configured to attach to an exterior of the housing and an energy storage device coupled to the coil and configured to store energy responsive to a current induced in the coil.

In some embodiments, an apparatus for charging can include a coil configured to wirelessly couple to a rotating member, where the rotating member is contained in a housing and the coil configured to attach to an exterior of the housing. A rectifier circuit can be coupled to the coil, and the rectifier circuit can be configured to rectify a voltage and a current induced in the coil to provide a rectified current and voltage. A switch can be configured to switch the rectified current and voltage to a charging output of the switch or to a monitor output of the switch responsive to a state of a control signal to the switch and an energy storage device can be coupled to the charging output of the switch and configured to storage charge responsive to the rectified current and voltage.

BRIEF DESCRIPTION OF THE DRAWINGS

FIG. 6 is a schematic illustration of a device including a rotating member wirelessly coupled to a wireless monitoring system located outside a housing of the device in some embodiments according to the invention.

FIG. 7 is a block diagram illustrating a device including a rotating member that is wirelessly coupled to a wireless power transfer device separate from a processor circuit and configured to transmit data collected by monitoring the device via the wireless power transfer device in some embodiments according to the invention.

DESCRIPTION OF EMBODIMENTS ACCORDING TO THE INVENTION

Figure 1:
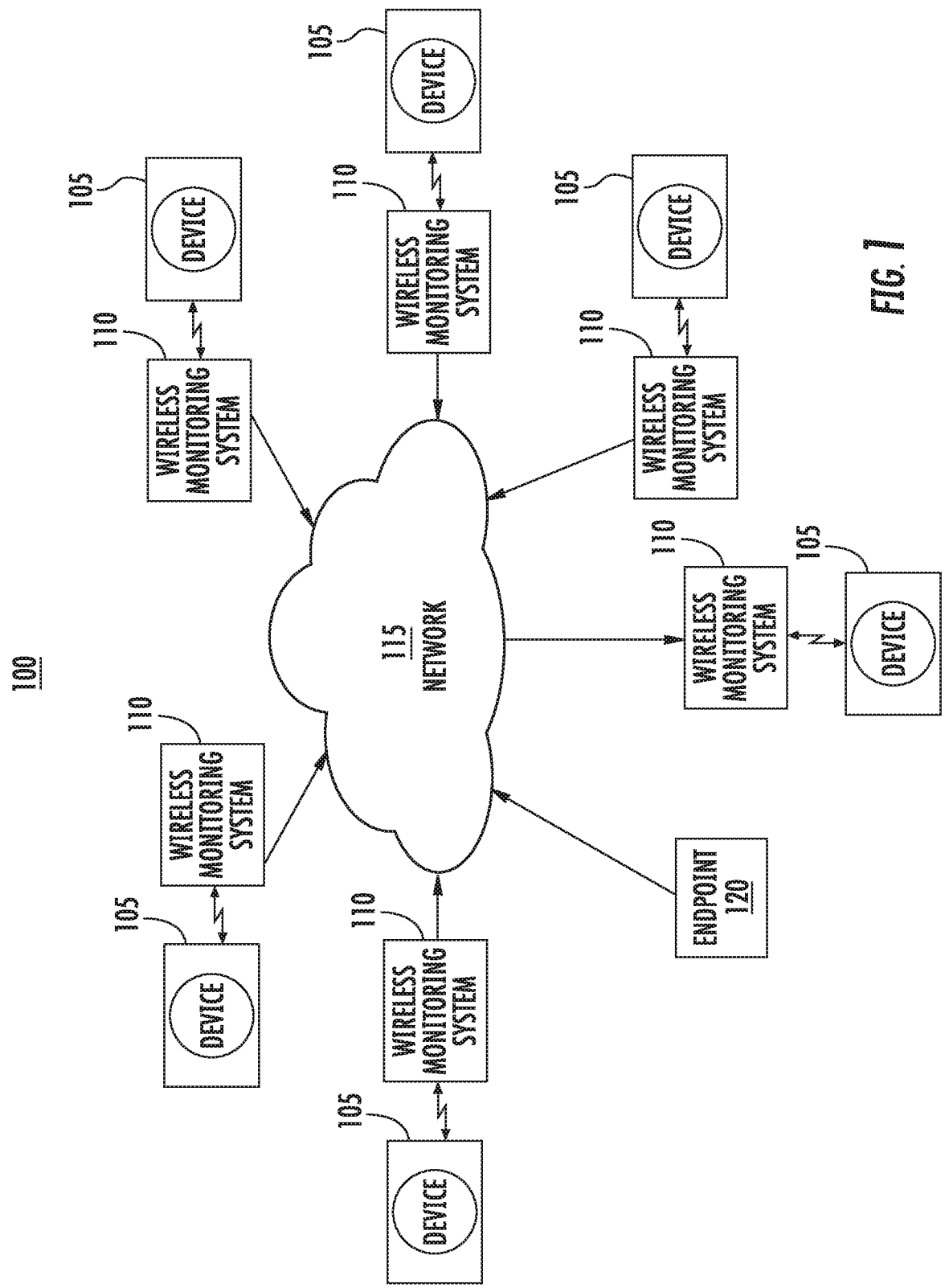
FIG. 1 is a schematic illustration of a plurality of devices with associated wireless monitoring systems connected to a network utilized to transmit and receive data to an endpoint for data collection and/or analysis in some embodiments according to the invention.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

FIG. 1 is a schematic illustration of a plurality of devices 105 each having a respective wireless monitoring system 110 configured to communicate with a network 115 over which sensor data can be transmitted to an endpoint 120 in some embodiments according to the invention. According to FIG. 1, each of the devices 105 can include a rotating member that generates a changing magnetic field that is wirelessly coupled to the wireless monitoring system 110. The wireless monitoring system 110 can include a plurality of sensors that are configured to measure operating parameters associated with device 105. For example, in some embodiments according to the invention, operating parameters can include vibration (i.e. movement), temperature, magnetic flux associated with the device, on/off time, and noise. Other operating parameters may also be monitored in some embodiments according to the invention. It will be further understood that the device can be, for example, any type of motor or other device that generates a changing magnetic field that is capable of inducing sufficient current to charge an energy storage device The wireless monitoring system 110 can be located outside a housing of the device 105 and can be configured for installation after the device 105 is deployed. For example, the wireless monitoring system 110 can be installed on or nearby a pre-existing device 105, such as a motor, so that the wireless monitoring system 110 can wirelessly couple to a rotating member inside the device 105. It will be understood, however, that in some embodiments according to the invention, the wireless monitoring system 110 and the device 105 can be installed together. In still other embodiments according to the invention, the wireless monitoring system 110 can be integrated with the device 105.

As appreciated by the present inventors, the rotating member in the device 105 can generate a magnetic field that can be used to wirelessly charge an energy storage device that powers the wireless monitoring system 110. For example, in some embodiments according to the invention, the device 105 can be an induction motor that includes a coil wrapped around a core. When the induction motor operates, the rotating coil/core (i.e., rotating member) generates a changing magnetic field (sometimes referred to herein as a magnetic field) that wirelessly couples to the wireless power transfer device to charge the energy storage device which can power the wireless monitoring system 110 for data collection and transmission/reception of data to the endpoint 120 over the network 115.

It will be understood that the device 105 can be any device which includes a rotating member that generates a changing magnetic field that can be used to wirelessly charge the energy storage device that powers the wireless monitoring system 110. Accordingly, the wireless monitoring system 110 can use a rechargeable energy storage device, such as a supercapacitor or rechargeable battery, so that the wireless monitoring system 110 may be in service longer than would otherwise be possible with a non-rechargeable energy storage device. For example, as appreciated by the present inventors, a non-rechargeable energy storage device may require that the entire wireless monitoring system 110 be replaced when the associated non-rechargeable energy storage device is depleted.

In contrast, in some embodiments according to the invention, the wireless monitoring system 110 can receive the changing magnetic field generated by the rotating member, and the charge resulting from the current induced in the wireless power transfer device can be stored in the rechargeable energy storage device, which can enable the wireless monitoring system 110 to operate for a longer time period. The extended operating time provided by the rechargeable energy storage device can enable longer/more reliable data collection on the device 105 and reduce costs by, for example, avoiding replacement of the wireless monitoring system 110 due to battery depletion (and associated installation costs). Moreover, longer operating time can enable the collection of more operating data on the device 105, which can increase improve reliability calculations and/or increase revenue derived from subscriptions to collected data.

As further shown in FIG. 1, the wireless monitoring system 110 can transmit the collected data associated with the device 105 over the network 115. It will be understood that the network 115 can be any type of network or collection of networks that supports ad-hoc inter-connection of the wireless monitoring systems 110 to the network 115, such as a Bluetooth network, Wi-Fi, LoRa, FlexNet, Dual LTE-M. Other types of networks may be used. Accordingly, the wireless monitoring system may wirelessly connect to the network 115 without user intervention and may receive remote instructions via the network 115. Still further, the wireless monitoring system 110 can be configured to transmit the collected data over the network 115 to the remote endpoint 120. It will be understood that the system 100 can include other remote endpoints 120.

It will be understood that the remote endpoint 120 can be a server that provides storage of the collected data for later analysis. The server may, for example, provide remote users with access to aggregated data collected on a particular device type, a particular class of devices, or any other organization of data collected on associated devices. The remote users may analyze the collected data to derive an understanding of the operations of that particular device, a particular class of devices, or the like.

In still further embodiments according to the invention, the system 100 can be included as a part of a subscription service whereby a party, such as an operator of the devices 105 or service organization responsible for maintaining the devices 105, can subscribe to data collection via the wireless monitoring system 110. For example, in an Internet Of Things (IoT) ecosystem, an operator of the devices 105 (such as an operator of manufacturing plants) may deploy a large number of the wireless monitoring systems 110 which may collect data related to the operations of respective devices 105. A subscriber of data may contract to receive the data collected on those devices 105, so that the subscriber receives information regarding operations of the devices 105. In still further embodiments according to the invention, the subscriber may be a manufacturer of certain ones of the devices 105 and may utilize the collected data for reliability analysis of the devices 105 or to provide field service support for those devices 105. In some embodiments, the subscriber may be a third party that aggregates the data for analysis by other parties. It will be further understood that the data collected via the network 115 can span a large number of different operators and a wide variety of devices 105, which can also be included as part of the collected data, such as hours of operation, geographic location, ambient temperatures, associated with the environment in which the devices 105 operate.

Furthermore, in the IoT ecosystem, the wireless monitoring system 110 can be part of a subscription service whereby a subscriber can receive particular types of data from selected ones of the devices 105 in a secure and frictionless transaction. For example, in an IoT ecosystem supported by blockchain technology, the subscriber may deploy a system that communicates with certain ones of the devices 105 for receipt of particular operating parameters associated therewith. In operation, the subscription system would, for example, conduct transactions to receive the operating data without the need for subscriber intervention. Still further, the operator, owner of the wireless monitoring system 110, or other party can receive revenue from the subscriber.

Figure 2:
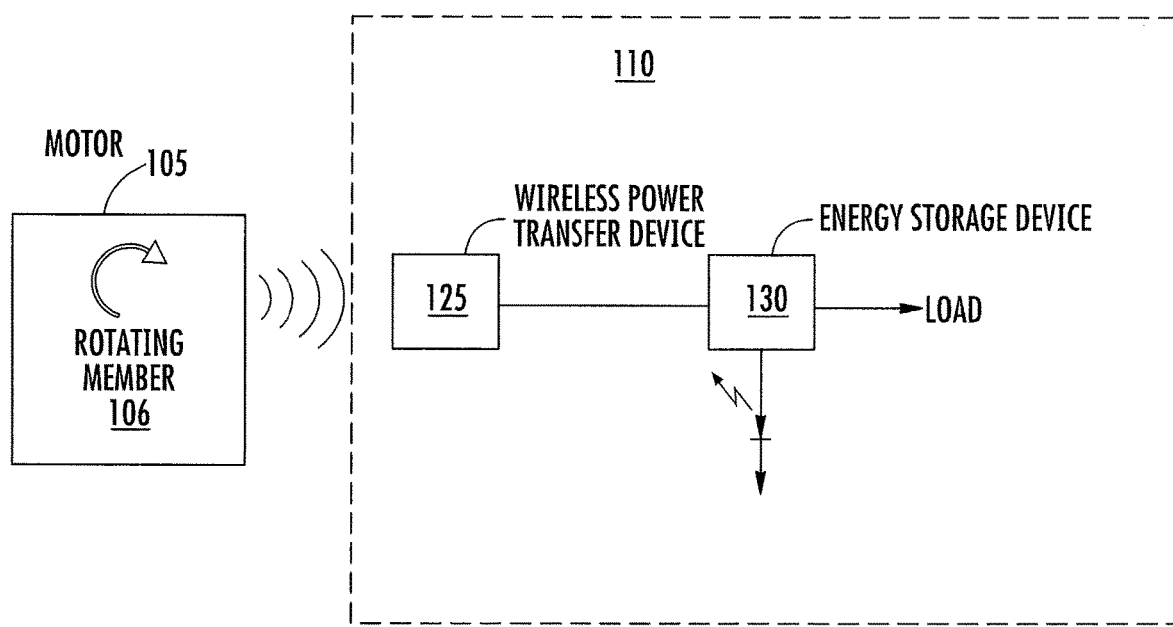
FIG. 2 is a block diagram illustrating a wireless monitoring system including an energy storage device and a wireless power transfer device wirelessly coupled to a rotating member of the device in some embodiments according to the invention.

FIG. 2 is a block diagram illustrating a wireless monitoring system 110 including an energy storage device 130 that is configured for charging via a wireless power transfer device 125 that is wirelessly coupled to a rotating member 106 within the device 105 in some embodiments according to the invention. According to FIG. 2, it will be understood that the wireless monitoring system 110 can include a processor circuit that is coupled to the energy storage device 130 to support operations of the wireless monitoring system 110, such as operations of sensors for the collection of data.

The wireless power transfer device 125 is configured to wirelessly receive the changing magnetic field 107 generated by the rotating member 106, which can be used to induce a current to charge the energy storage device 130 so that the wireless monitoring system 110 may operate under control of the processor circuit. In operation, the wireless power transfer device 125 can immediately begin charging the energy storage device 130 responsive to operation of the device 105. In some embodiments, the processor circuit may receive the induced current/voltage directly so that operations of the wireless monitoring system may begin while the energy storage device 130 is also charged.

It will be understood that in some embodiments according to the invention, the energy storage device 130 may be charged under the control of the processor circuit. In such embodiments, the processor circuit may receive the power generated by the wireless power transfer device 125, whereupon the processor circuit controls charging of the energy storage device 130. It will further be understood that the energy storage device 130 may be any device which can store charge in response to the changing magnetic field 107 received by the wireless power transfer device 125.

As further shown in FIG. 2, the wireless power transfer device 125 may include an indicator 114, such as a light that provides an indication that the changing magnetic field 107 received by the wireless power transfer device 125 is greater than or equal to a predetermined level so that operations of the wireless monitoring system 110 may be supported. For example, in some embodiments according to the invention, during installation the indication device 114 can provide visual feedback to a technician when positioning the wireless power transfer device outside the device 105. The visual indication may be provided when, for example, the current induced in the wireless power transfer device 125 is sufficient to charge the energy storage device 130 so that the processor circuit may maintain operations of the wireless monitoring system 110. If the technician observes that there is no visual indication, however, the technician may be prompted to relocate the wireless power transfer device 125 relative to the rotating member 106 until a visual indication is provided. The technician may then fix the wireless power transfer device 125 in that location where the magnetic field 107 received from the rotating member 106 is sufficient. Accordingly, the technician may be assured that the installation is properly configured to receive sufficient wireless power transfer so that the wireless monitoring system 110 may operate reliably. It will be further understood that indication device 114 can be any device that provides an indication that the wireless power transfer is sufficient to support charging of the energy storage device 130. For example, the indication device 114 can be an audio indication device, a visual indication device, a tactile indication device, or the like.

It will be further understood that the rotating member 106 can be any structure within the device 105 which generates the changing magnetic field 107. For example, in some embodiments according to the invention, the rotating member may be a magnetic core material wound with a wire to provide a rotating coil to generate the changing magnetic field 107. In still further embodiments according to the invention, rotating member 106 can be a permanent magnet that generates the changing magnetic field 107 to support wireless power transfer to the wireless power transfer device 125. In still further embodiments according to the invention, the rotating member 106 can rotate at a fixed frequency or a viable frequency when, for example, the device 105 is a variable speed motor.

Figure 3:
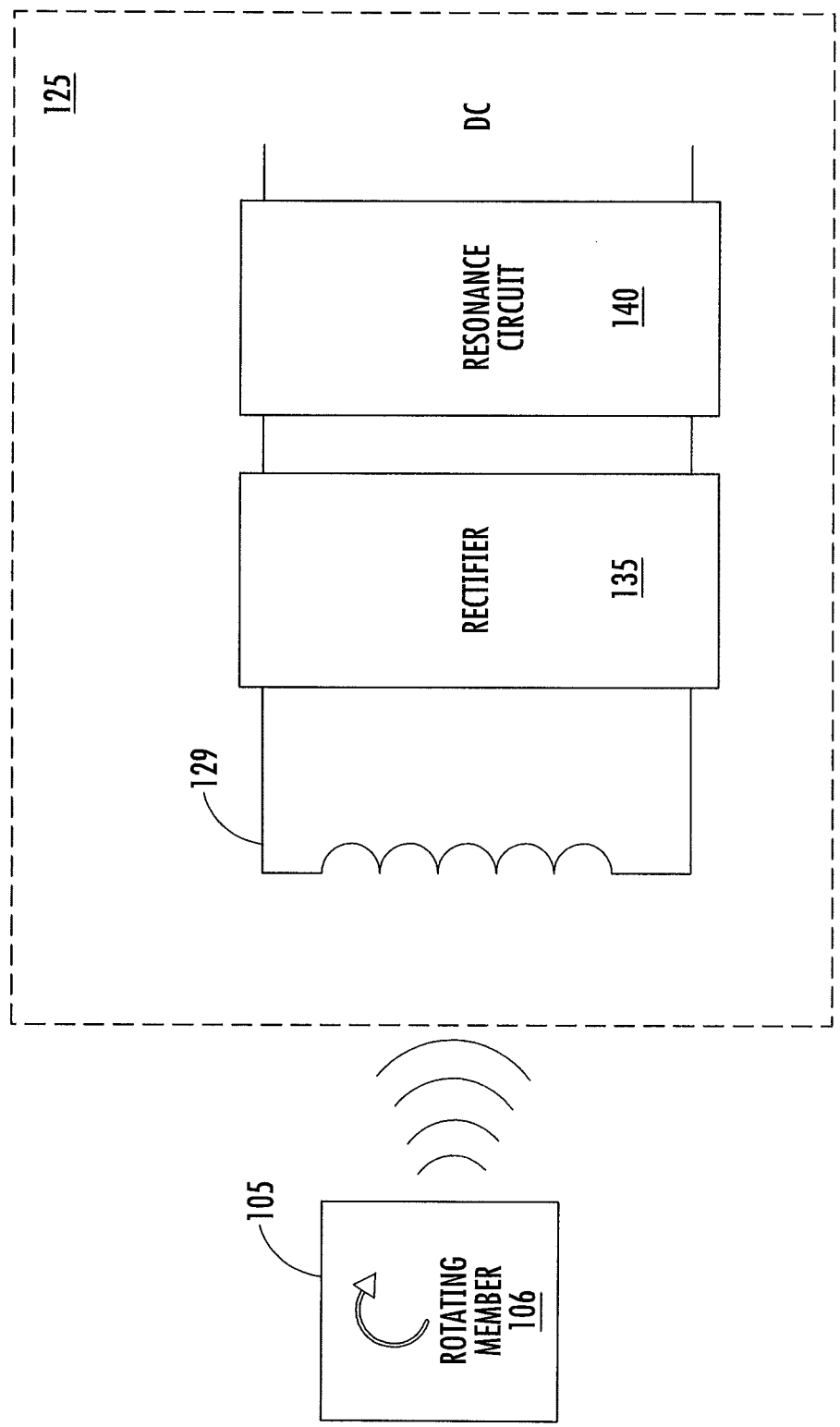
FIG. 3 is a block diagram of a wireless power transfer device wirelessly coupled to a rotating member in the device in some embodiments according to the invention.

FIG. 3 is a block diagram of a wireless power transfer device 125 configured to wirelessly couple to the device 105 for reception of the changing magnetic field 107 to generate DC current/voltage for charging the energy storage device 130 in some embodiments according to the invention. According to FIG. 3, the rotating member 106 wirelessly couples the changing magnetic field 107 to a coil 129 to generate an alternating current I in the coil 129 and an alternating voltage V across the coil 129 (hereinafter referred to as the induced current/voltage). It will be understood that the coil 129 can be a conductor that is wound so that when the change in magnetic field 107 is brought into proximity with the coil 129, the induced current/voltage is generated. In some embodiments according to the invention, the coil 129 is wound around a core material, such as a ferromagnetic material. In some embodiments according to the invention, the coil 129 may have no core (e.g., an airspace) or may include other non-ferromagnetic materials. In some embodiments, multiple cores 129 can be coupled together to provide increased induced current/voltage. Any type of inductor may be used for the coil 129.

The induced current/voltage are provided to a rectifier circuit 135 which provides a rectified voltage/current which may be provided for charging the energy storage device 130. It will be understood that the coil 129 and components in the rectifier 135 can be passive circuits which do not require external power supplies for operation so that the induced current/voltage can be provided to the energy storage device 130 upon operation of the device 105. In other words, in some embodiments according to the invention, charging of the energy storage device 130 may commence once the rotating member 106 begins rotating, which may not require operation of the processor circuit for charging of the energy storage device 130 to begin.

In still further embodiments according to the invention as shown in FIG. 3, the output of the rectifier circuit 135 can be coupled to a resonance circuit 140 which can be provided in a default configuration to provide resonance at a particular frequency that is associated with the rotational frequency of the rotating member 106. In still further embodiments according to the invention, the resonance circuit 140 can operate under the control of the processor circuit. In operation, the resonance circuit 140 may be have a default configuration for a particular frequency of rotation associated with the rotating member 106 such that maximum power transfer can be provided by the wireless power transfer device 125. In operation, however, the processor circuit may change the configuration of the resonance circuit 140 to compensate for a change in the rotational frequency of the rotating member 106, such as when the device 105 is a variable speed motor. Other types of devices may also be utilized where the frequency of the rotating member changes or when the processor circuit.

Figure 4:
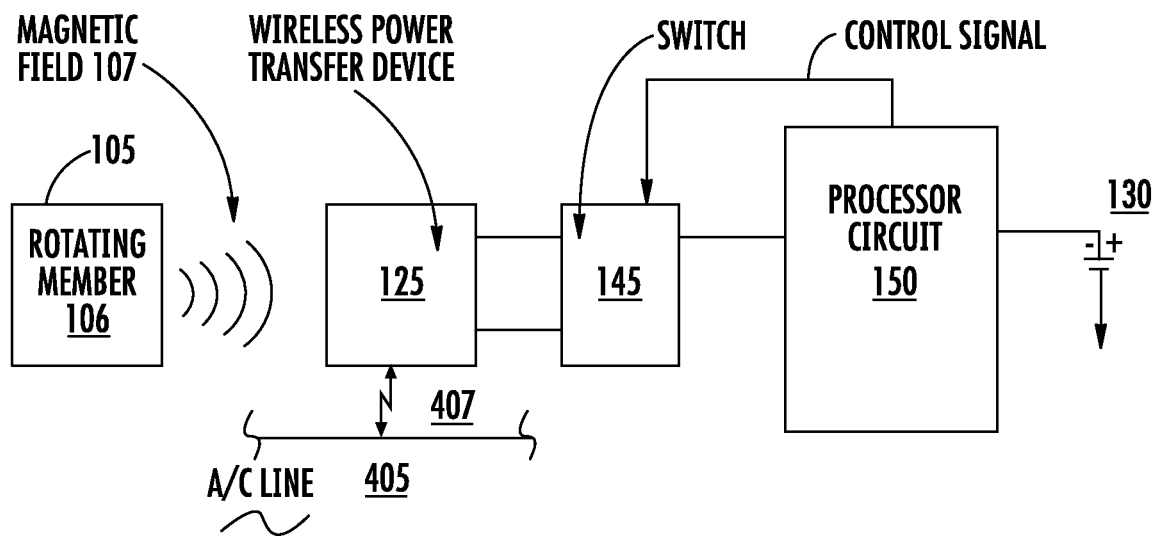
FIG. 4 is a block diagram illustrating a wireless monitoring system including a processor circuit configured to manage charging of an energy storage device and coupled to a wireless power transfer device via a switch in some embodiments according to the invention.

FIG. 4 is a block diagram of a wireless monitoring system including a processor circuit 150 configured to manage charging of the energy storage device 130 using the wireless power transfer device 125 and a switch 145 in some embodiments according to the invention. According to FIG. 4, the wireless power transfer device 125 is wirelessly coupled to the rotating member 106 housed within the device 105 to generate a DC current/voltage to the switch 145. As further shown in FIG. 4, the processor circuit 150 is also configured to adjust the resonance circuit of the wireless power transfer device as described above in reference to FIG. 3.

The processor circuit 150 is also configured to control the setting of the switch 145 using a control signal. In a first state, the control signal is configured to switch the DC current/voltage to the processor circuit 150 to charge the energy storage device 130. In a second state, the processor circuit 150 can divert the DC current/voltage to a second input of the processor circuit that is configured to determine the level of the DC voltage. In some embodiments according to the invention, diverting the DC voltage to the second input of the processor circuit 150 can isolate the DC voltage from the energy storage device 130 so that the processor circuit 150 can determine the level of the voltage without a significant load. In operation, the processor circuit 150 may first divert how the DC voltage to the second input to determine whether a threshold value for the DC voltage has been met before beginning to charge the energy storage device 130.

It will be understood that the control signal shown in FIG. 4 can also provide control over the switch 145 as described herein. Still further as shown in FIG. 4, the DC voltage provided to the processor circuit 150 can be applied across a filter capacitor 146 which in turn is then applied to the energy storage device 130. In operation, the processor circuit 150 can control the charging of the energy storage device 130 based on the determined level of charge present in the energy storage device 130. For example, the processor circuit 150 may determine that the energy storage device 130 is fully charged and therefore divert the DC voltage away from the input used for charging and instead provides the DC voltage to the alternative load, such as a second energy storage device or directly to a power supply input of a circuit. The processor circuit 150 can also include an interface to a plurality of sensors as described above in reference to FIG. 1 as well as provide communications for transmissions of the operating parameters associated with the device 105 to the network 115 as described for example in reference to FIG. 1.

As further shown in FIG. 4, in some embodiments, the wireless power transfer device 125 can be wirelessly coupled to a changing magnetic field that is generated from an AC line 405 that located proximate to the wireless power transfer device. In such embodiments, the AC line 405 can generate the changing magnetic field when, for example, the energy storage device 130 is fully depleted due to the rotating member 106 being dormant for an extended of time. Still further, once the energy storage device 130 is partially charged via the AC line 405, the processor circuit 150 can control the wireless power transfer device to resume wirelessly coupling the rotating member 106 to the wireless power transfer device 125 for further charging of the energy storage device 130.

Figure 5:
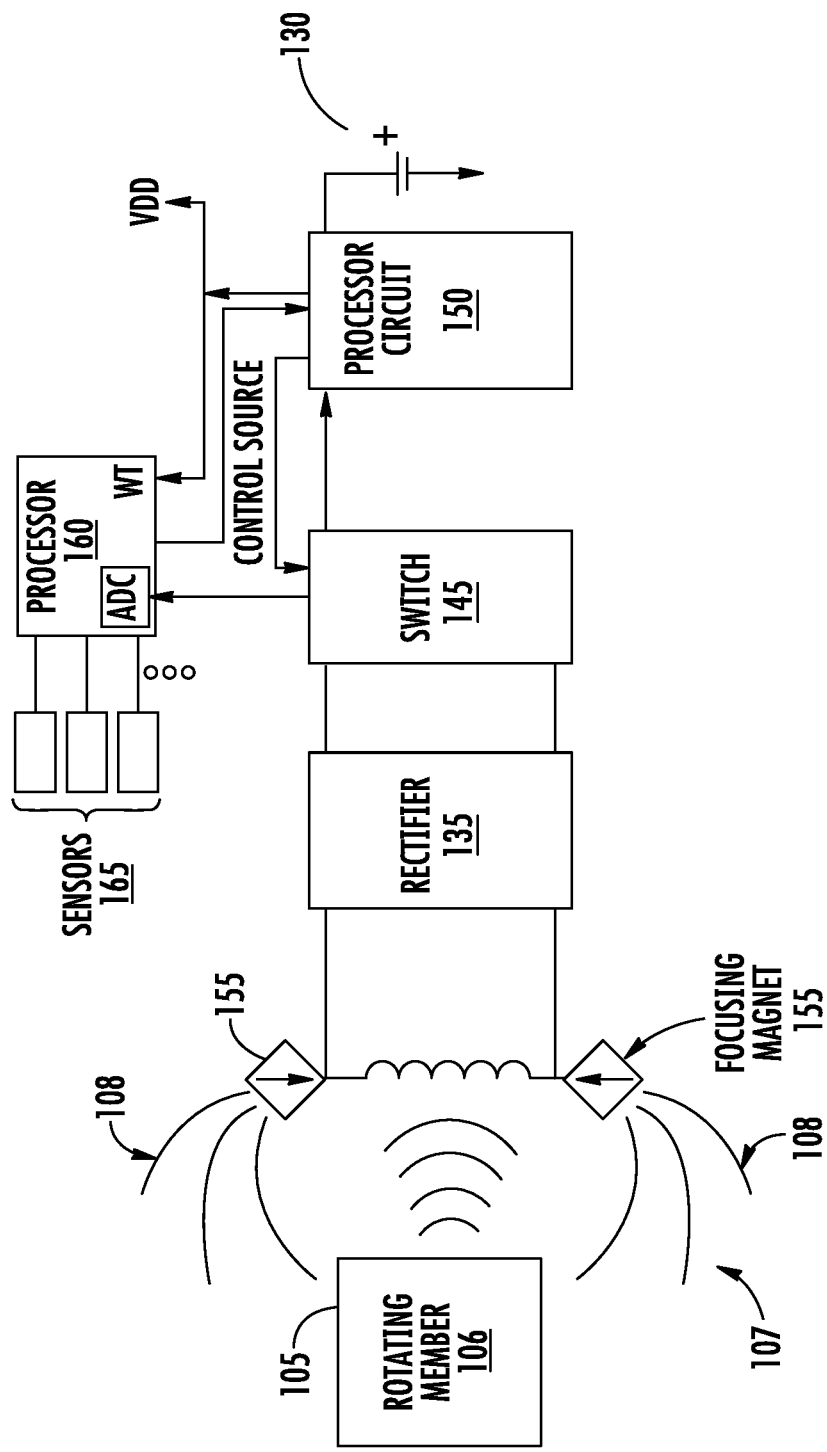
FIG. 5 is a block diagram of a wireless monitoring system operated by a processor circuit configured to control the charging of an energy storage device coupled to a wireless power transfer device that includes focusing magnets in some embodiments according to the invention.

FIG. 5 is a block diagram of a wireless monitoring system 110 including a second processor circuit 160 configured to manage operation of a plurality of sensors 165 and the processor circuit 150 configured to charge the energy storage device 130 in some embodiments according to the invention. According to FIG. 5, the coil 129 included in the wireless power transfer device 125 is coupled to focusing magnets 155 that are configured to redirect portions 108 of the magnetic field 107 to the coil 129 to boost the induced current/voltage provided to the rectifier circuit 135.

As appreciated by the present inventors, the focusing magnets 155 can increase the magnetic field at the coil 129 to increase the induced current/voltage. In turn, the rectifier circuit 135 can provide greater DC current/voltage to the switch 145. In operation, the processor circuit 150 can control the state of the switch 145 to either direct the DC current/voltage to the processor circuit 150 to charge the energy storage device 130 or divert the DC current/voltage to the second processor 160 which may determine the level of the voltage provided at the coil 130. In some embodiments, the focusing magnets 155 can be re-positioned to interactively redirect the portions 108 of the magnetic field during installation so that sufficient wireless power transfer can occur. It will be understood that the adjustments made to the focusing magnets can be made in conjunction with the indicator device 114 so that the technician can adjust the focusing magnets using the feedback from the indicator device 114.

In some embodiments, the second processor circuit 160 can also control operations of the processor circuit 150. For example, in some embodiments according to the invention, when the second processor circuit 160 is communicating with the network 115, the second processor circuit 160 can instruct the processor circuit 150 to stop charging the energy storage device 130 until communications are complete. In still further embodiments according to the invention, the second processor circuit 160 can control the switch 145 (either directly or via the processor circuit 150) to route the DC voltage to an Analog to Digital Converter (ADC) input of the second processor circuit 160 to determine the level of the DC voltage. Once the level of the DC voltage provided by the switch 145 meets a particular threshold, however, the second processor circuit 160 can switch the DC voltage to the processor circuit 150 for control over charging the energy storage device. As further shown in FIG. 5, the second processor circuit 160 can also distribute power to other components included in the wireless monitoring system 110.

FIG. 6 is a schematic illustration of the device 105 including a rotating member 106 configured to generate the magnetic field 107 that is wirelessly coupled to the wireless monitoring system 110 located on the housing of the device 105. FIG. 7 is a schematic illustration of the device 105 including the rotating member 106 that generates the magnetic field 107 that is wirelessly coupled to the wireless power transfer device 125. In some embodiments according to the invention, the wireless power transfer device 125 is located outside the housing of device 105 proximate to the rotating member 106 so to receive a sufficient level of the magnetic field 107 from the rotating member 106. Still further as shown in FIG. 7, the wireless power transfer circuit 125 may be separate from the remainder of the components in the wireless monitoring system 110. Accordingly, in some embodiments according to the invention, the wireless power transfer device 125 may be located nearer to the device 105, whereas the remainder of the components included in the wireless monitoring system 110 may be located elsewhere for ease and installation. Accordingly, the wireless power transfer device 125 may be removably coupled to the remainder of the wireless monitoring system 110 by a connector. Still further, the wireless power transfer device 125 may be utilized to derive energy from the magnetic field to provide power to systems other than the wireless monitoring system 110 as described herein.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

What is claimed:

1. A method of charging an energy storage device, the method comprising:
   wirelessly coupling to a rotating member contained in a housing using a coil attached to an exterior of the housing;
   charging an energy storage device using a current induced in the coil during rotation of the rotating member in response to a request for charging the energy storage device;
   suspending charging of the energy storage device in response to a request to suspend charging of the energy storage device; and
   transmitting information provided by one or more sensors, operatively coupled to the rotating member, each sensor configured to measure a respective parameter associated with the rotating member, to a wireless network.

2. The method of claim 1 wherein the rotating member comprises a rotating coil.

3. The method of claim 1 wherein the rotating member comprises a rotating permanent magnet.

4. The method of claim 1 wherein the coil is wound around a magnetic core.

5. The method of claim 1 further comprising:
   determining an indication of a magnetic flux associated with the rotating member based on the current.

6. The method of claim 1 further comprising:
   rectifying a voltage associated with the current to provide a rectified voltage;
   switching the rectified voltage to a circuit configured to determine a magnitude of the rectified voltage when isolated from other loads responsive to a control signal in a first state; and
   switching the rectified voltage to the energy storage device for charging responsive to a control signal in a second state.

7. The method of claim 6 wherein the second state indicates that the magnitude of the rectified voltage is above a threshold value sufficient for charging the energy storage device.

8. The method of claim 6 wherein the second state indicates the request for charging the energy storage device.

9. The method of claim 6 wherein the first state indicates the request to suspend charging of the energy storage device.

10. An apparatus comprising:
    a coil configured to wirelessly couple to a rotating member, the rotating member contained in a housing and the coil configured to attach to an exterior of the housing;
    an energy storage device coupled to the coil and configured to store energy responsive to a current induced in the coil by rotation of the rotating member;
    one or more sensors operatively coupled to the rotating member, each of the one or more sensors configured to measure a respective parameter associated with the rotating member;
    a processor circuit coupled to the one or more sensors, wherein the processor circuit is configured to receive charge state information of the energy storage device and to transmit a command configured to enable charging of the energy storage device or to disable charging of the energy storage device; and
    a communications interface coupled to the processor circuit, the communications interface configured to transmit the respective parameters, to a wireless network.

11. The apparatus of claim 10 wherein the rotating member comprises a rotating coil.

12. The apparatus of claim 10 wherein the rotating member comprises a rotating permanent magnet.

13. The apparatus of claim 10 wherein the coil is wound around a magnetic core.

14. The apparatus of claim 10 further comprising:
    at least one focusing magnet wirelessly coupled to an end of the coil, wherein the focusing magnet is configured to redirect portions of a magnetic field generated by the rotating member toward an interior of the coil.

15. The apparatus of claim 10 wherein the energy storage device comprises a battery.

16. The apparatus of claim 10 wherein the energy storage device comprises a supercapacitor.

17. An apparatus for charging, the apparatus:
    a coil configured to wirelessly couple to a rotating member, the rotating member contained in a housing and the coil configured to attach to an exterior of the housing;
    a rectifier circuit coupled to the coil, the rectifier circuit configured to rectify a voltage and a current induced in the coil to provide a rectified current and voltage;
    a switch configured to switch the rectified current and voltage to a charging output of the switch or to a monitor output of the switch responsive to a state of a control signal to the switch;
    an energy storage device coupled to the charging output of the switch and configured to storage charge responsive to the rectified current and voltage;
    a plurality of sensors operatively coupled to the rotating member, each of the plurality of sensors configured to measure a respective parameter of the rotating member;
    a processor circuit coupled to the plurality of sensors, and coupled to the charging output of the switch to receive the rectified current and voltage, and coupled to the energy storage device,
    wherein the processor circuit is configured to receive charge state information of the energy storage device and to generate a divert/charge command;
    wherein the processor circuit is configured to set a first state of the control signal to receive the rectified current and voltage to charge the energy storage device and set a second state of the control signal to divert the rectified current and voltage away from the energy storage device; and a communications interface coupled to the processor circuit, the communications interface configured to transmit information associated with each respective parameter to a wireless network responsive to the processor circuit.

18. The apparatus of claim 17 further comprising:

at least one focusing magnet wirelessly coupled to an end of the coil, wherein the focusing magnet is configured to redirect portions of a magnetic field generated by the rotating member toward an interior of the coil.

19. The apparatus of claim 17 wherein the energy storage device comprises a battery.

20. The apparatus of claim 17 wherein the energy storage device comprises a supercapacitor.

\* \* \* \* \*